Aug. 4, 1970 J. E. THRON ET AL 3,522,589

DATA PROCESSING APPARATUS

Original Filed Jan. 20, 1966 3 Sheets-Sheet 1

Aug. 4, 1970 J. E. THRON ET AL 3,522,589

DATA PROCESSING APPARATUS

Original Filed Jan. 20, 1966 3 Sheets-Sheet 3

United States Patent Office 3,522,589
Patented Aug. 4, 1970

3,522,589

DATA PROCESSING APPARATUS

John E. Thron, Cambridge, Michael H. Blume, Arlington, David L. Reed, Brockton, Howard Stein, Waban, and John O. Wiley, Hopkinton, Mass., assignors to Honeywell Inc., Minneapolis, Minn., a corporation of Delaware Continuation of application Ser. No. 521,865, Jan. 20, 1966. This application Oct. 31, 1968, Ser. No. 796,252
Int. Cl. G06f 9/20
U.S. Cl. 340—172.5 16 Claims

ABSTRACT OF THE DISCLOSURE

An apparatus for enabling a variable width to variable width translation including a look-up table capable of being variably positioned within the limit of a conventional memory. To accommodate this operation, means are provided to superimpose the contents of a register defining the base location of the look-up table in memory with the contents of a register defining the identity of the translated equivalent.

This is a continuation of application Ser. No. 521,865, filed Jan. 20, 1966, now abandoned.

The present invention concerns an electronic apparatus for processing data and instructions. More specifically, the present invention is directed to a data processing system comprising a look-up table utilized for translation purposes whereby the translation of one or more items of information may be effected with maximum economy of both memory space and processing time.

In a data processing apparatus, it is often desirable to utilize a variable length format both with respect to the operative instructions and the data field. In this respect, it has heretofore been proposed to process information on a character basis. Accordingly, in a character oriented system a predetermined number of informational bits may be combined with appropriate punctuation and error checking bits to define an operational character of unit length. In order to completely define an operation, a plurality of characters may be combined with appropriate punctuation bits to define the limits of the instruction.

This selective combination of characters to formulate a complete program instruction may be facilitated by using particular bit combinations to define the limits of an instruction. It has also been proposed to utilize a special level or plane of bits in combination with particular bit representations to effect the desired punctuation. Thus, in a seven bit character format, the contents of the first six bits may be used in particular code combinations to convey information, while the contents of the seventh bit position may be used to define the length of the program instruction or the limits of a data field. It has also been proposed to give special recognition to the informational contents of a character with which a defining bit of punctuation is associated according to the position the punctuation bearing character enjoys within the instruction format.

Also included among the techniques known to the data processing art is use of a look-up table for translation purposes. In this respect, techniques are known whereby a block of consecutive memory locations are reserved for the storage of digital representations corresponding to the coded translation of another digital representation, the latter being considered foreign to the vocabulary of the present system. The translation from the foreign code to the stored equivalent may be effected by various known techniques depending upon the type of memory, i.e. whether it is location or content addressable.

The present invention concerns the implementation of a new and novel look-up table, one feature of which concerns the ability to readily assume a variable base location with respect to a conventional location-addressable memory.

Accordingly, a primary object of the present invention is to provide a look-up table technique which has an assignable base location with respect to its associated memory store.

In the present invention means are provided to permit the selective association of defining punctuation with respect to the contents of a look-up table such that, upon referencing of the preselected location, a change sequence mode operation will automatically be initiated. The change sequence mode operation is characterized in that the normal sequence of operations relating to the referencing of the contents of the translation table is interrupted with a new sequence initiated. A change seqence mode operation may be initiated whenever an otherwise non-translatable item calls on the translation table to be translated. In such instances, the newly instituted sequence of operations constitutes a special routine to handle the otherwise non-translatable item.

Accordingly, it is a further object of the present invention to provide a look-up table in combination with an electronic data processing system including means responsive to the contents of predetermined locations of the look-up table to initiate a change sequence mode of operation.

The principles of the present invention have been implemented by a novel and unique arrangement of system components which permits the concatenation of a plurality of characters of information being extracted from main memory for the purpose of defining the address of a particular item in the look-up table. Means are further provided to superimpose a like number of characters, defining the base address of the look-up table, onto the characters extracted from memory taken either singly or in combination. In like manner, the translatable equivalent of an item may be stored in adjacent locations within the look-up table. Means are provided to uniquely define the location within the look-up table of the first of such multi-character equivalents as well as the location of all adjacent characters.

It is therefore a further object of the present invention to provide means associated with a look-up table whereby information bits defining the actual storage locations of the hook-up table are selectively combined with further characters of information including bits defining the base location of the look-up table so as to enable the variable positioning of the table within memory.

Yet another object of the present invention is to provide means to uniquely define the address of the lead character in a multi-character operand and to conveniently increment the addressing means for the purpose of referencing an adjacent location.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
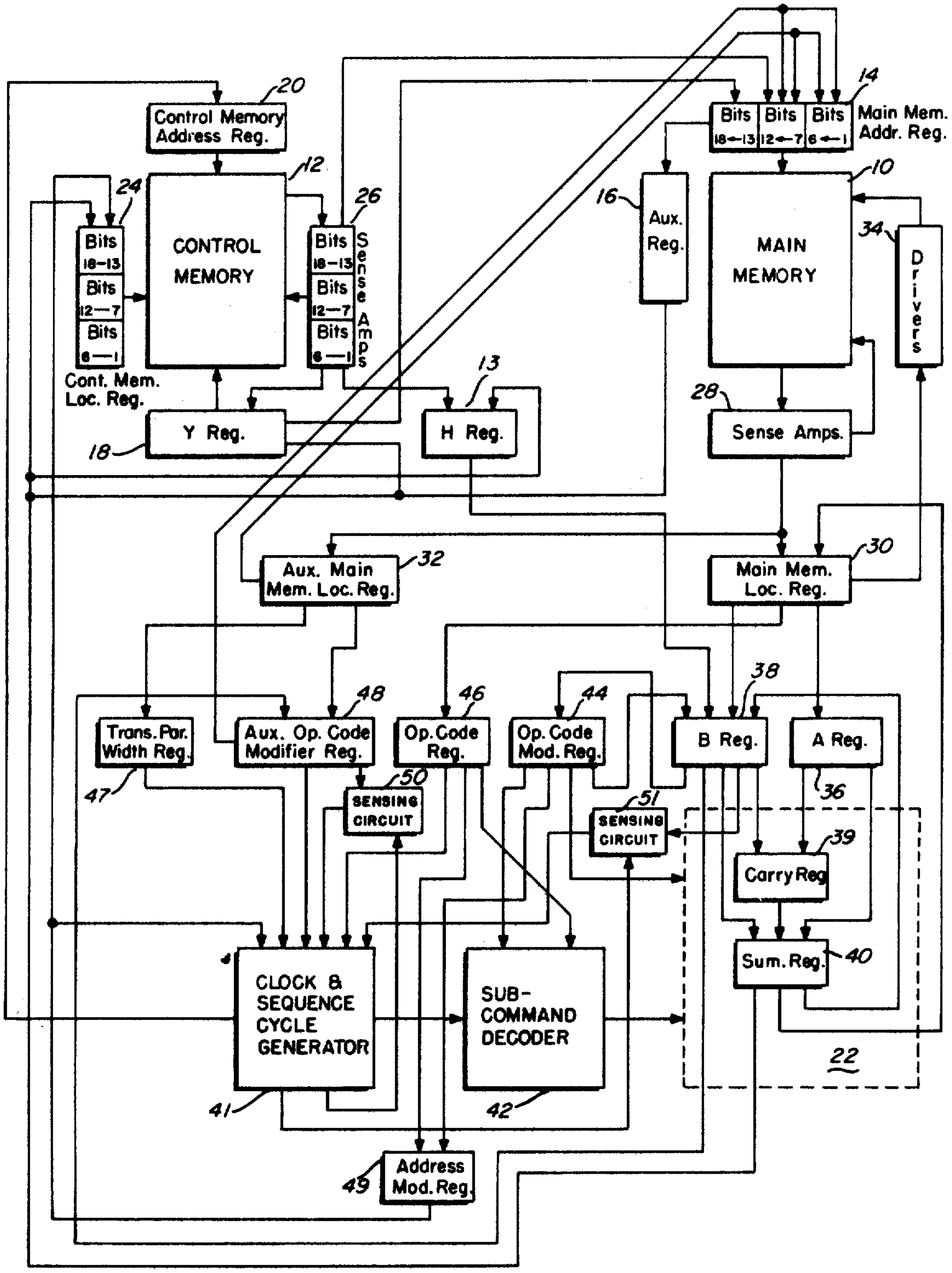
FIG. 1 is a diagrammatic representation of a data processing apparatus incorporating the principles of the present invention.

Referring first to FIG. 1, therein is shown in diagrammatic fashion the basic elements of an apparatus embodying the principles of the present invention. The numeral 10 identifies a main memory which may comprise a multiplane coincident current core storage unit of the form described in Pat. No. 3,201,762 which issued to Henry W. Schrimpf Aug. 17, 1965. Access to the main memory from an associated control memory 12 is provided by a multistage main memory address register 14 which contains the address of a location within main memory being referenced. Associated with the main memory address register 14 is an auxiliary register 16 into which the contents of the main memory address register 14 are transferred and thereafter incremented, decremented, or transmitted unchanged to an input register 18 associated with the control memory 12. Alternatively, the information is transferred from the main memory auxiliary register 16 to the control memory 12 via a register 24 designated herein as the control memory local register.

The control memory 12 may be comprised of a plurality of conventional multi-position storage registers which store information pertinent to the processing of the various program instructions. In this respect, all the program instructions are processed through the control memory which aids in the selection, interpretation and execution of these in order. In a preferred embodiment of the present invention, the control memory 12 contains a plurality of special purpose registers including sequence and co-sequence registers, A and B address registers containing the main memory address of the operands that are specified by the instruction being executed, starting and present location counters associated with each of a plurality of read-write channels utilized to communicate between main memory and a plurality of peripheral devices not shown, external and internal interrupt registers to facilitate the interchange of operative routines without the further need of an instruction, and working location registers used by the central processor during execution of an instruction as a storage area for an address or possibly as a disposal area for unwanted information.

The plurality of storage registers comprising the control memory 12 are addressed through a control memory address register 20. Information is transferred into the control memory from the auxiliary register 16 either via the Y register 18, or the control memory local register 24. In addition, information may enter the control memory 12 as the output of an adder, indicated generally as member 22, by way of the control memory local register 24. The control memory 12 is capable of transferring any of its stored information into the main memory address register 14 by way of the associated sense amplifiers, indicated herein generally as member 26, and alternatively, via the Y register 18. Information transferred into the sense amplifiers 26 is automatically restored to its originating register within control memory; however, means are provided to automatically inhibit the restoration operation.

Both the control memory local register 24 and the sense amplifiers 26 possess multi-character storage facilities including the ability to selectively enter characters of information being directed to the various storage locations thereof. Just as these register locations are capable of entering information on a character basis, they are also capable of being cleared on a character basis. This capability enables information previously stored, to be combined with newly entered information, to thereby completely define a particular operation. The main memory address register 14 is likewise characterized by the ability to have characters, comprising the main memory address, selectively entered therein.

Returning now to the main memory 10, it should be noted that information is transferred therefrom via a plurality of conventional sense amplifiers, indicated herein generally as member 28. A separate sense amplifier is associated with each bit level of the digital representation stored in a location of main memory. A preferred embodiment of the present invention is operative on a character basis with each character to be further comprised of six informational and two punctuation bit levels in addition to a parity bit used for error checking purposes. As indicated, means are provided to enable the sense amplifiers 26 and 28 associated with the control and main memories respectively to restore to their original location in main memory, the bit representation transferred into the sense amplifiers.

The outputs associated with the sense amplifiers 28 of main memory 10 are jointly distributed to a main memory local register 30 and an auxiliary main memory local register 32. The duplication of the main memory local register 30 as embodied in the auxiliary main memory local register 32 enables information being extracted from addressed main memory locations to be readily distributed to the various operational registers comprising the balance of the system, thereby expediting the distribution of the information without incurring time losses due to disadvantageous load considerations. Means, including conventional drivers 34, are provided to transfer the contents of the main memory local register 30 into addressed locations of main memory 10. The main memory local register is further provided with means, not shown, to generate checking data pertinent to the information being brought into memory and to recheck the information bits as they are withdrawn.

Reference is now made to the adder 22 of FIG. 1 which, in the preferred embodiment, is capable of performing both binary and decimal arithmetic. Two operand storage registers 36 and 38 are operatively connected to the input of the adder 22. These registers provide means for storing the A and B operands respectively during the processing of program instructions. Information enters the A and B operand registers from the main memory local register 30. Included in the adder 22 is a carry function portion 39 which effects the selected combination of signals from corresponding stages of the A and B operand registers 36 and 38 with carry signals being generated in the respective stages thereof. This selective combination of signals is effected in accordance with control signals generated in means including the clock and sequence cycle generator 41 which is shown as being connected to the adder 22 through a subcommand decoder 42. It is the function of the sequence cycle generator 41 and subcommand decoder 42 to define the sequence of activities to be performed during the extraction and execution phases of each instruction and further establish the nature of the current operation as being logical or arithmetic in nature.

Referring once more to adder 22, output signals from corresponding stages of the A and B operand registers 36 and 38 are combined with signals from the carry function portion 39, in a sum register 40. Normally, the output of the sum register 40 is transferred to the main memory local register 30 for subsequent storage in the main memory 10. However, means are also provided to return the output of the sum register 40 to the input of the B operand register 38. The output of the sum register 40 is further connected through a buffer register 13 to the input of the B operand register 38. Buffer register 13 further connects the output of the sense amplifiers 26 of control memory 12 as an input to the B operand register 38.

Four additional registers 44, 46, 47 and 48 are provided for storing the operational code and the operational code modifier characters which specify the details of an instruction to be performed. More specifically, the operational code, which will hereinafter be referred to more simply as the Op Code, defines the fundamental operation being performed by the program instruction. The Op Code is transferred to the Op Code register 46 from the main memory 10 via sense amplifiers 28 and main memory local register 30. The Op Code modifier register 44, the Translation Parameter Width Register 47, and the auxiliary Op Code modifier register 48 all contain various characters used to extend the definition supplied by the Op Code or to provide additional information basic to the execution of a particular program instruction. Information is transferred into the Op Code modifier register 44 from the main memory 10 via the sense amplifier 28, the main memory local register 30 and the B operand register 38. In like manner, information is selectively transferred into the Translation Parameter Width Register 47 and the auxiliary Op Code modifier register 48 from the main memory 10 via the sense amplifiers 28 and the auxiliary main memory local register 32. Means are provided to selectively transfer the contents of the auxiliary main memory local register 32 and the auxiliary Op Code modifier register 48 to selective character locations of the main memory address register 14.

Outputs from the Op Code modifier register 44, the Op Code register 46 and the auxiliary Op Code register 48 are connected to the clock and sequence cycle generator 41 as well as the subcommand decoder 42. As indicated above, it is the function of the sequence cycle generator 41 and the subcommand decoder 42 to generate the requisite control signals pertinent to the execution of a particular program instruction. In this respect, means are provided to connect the output of the sequence cycle generator 41 to the control memory address register 20.

When operative in its normal capacity, the sequence cycle generator is effective in setting up a multi-bit control memory address in the control memory address register 20 thereby identifying the lead instruction of a particular program being processed. As will be apparent to those skilled in the art, the processing of a particular program may also be intiated automatically by appropriate subsequencing brought about in another program or by branching orders which effect a desired transfer from one program to another. Circuitry for initiating an automatic transfer is discussed in a patent to Henry W. Schrimpf, issued Apr. 10, 1962 as U.S. Pat. No. 3,029,414.

Connected to outputs from both the Op Code and the Op Code modifier registers 46 and 44 respectively is an address mode register 49. The function of the address mode register is to store an indication depicting the mode of processing as being in either the two, three or four character addressing mode. In its most elemental form, the address mode register 49 may comprise a pair of conventional flip-flops; however, by merely enlarging the storage capacity thereof through additional stages, it is possible to indicate which of "N" possible modes the processing is to proceed in. The variable character addressing mode is designed to accommodate the efficient utilization of memory space in accordance with the total capacity of the memory being addressed. More specifically, the number of bits required to completely define a memory location is in direct proportion to the total number of memory locations available. In an expandable system, it would normally be necessary to specify, in terms of hardware incorporated in the machine at the time of its design, the maximum addressing capacity of the system. This in turn places a limit on the total memory capacity. Alternatively, conventional indirect addressing techniques may be utilized to construct a complete address. An inherent limitation of this latter mode of operation, however, concerns the expenditure of additional time to generate the complete memory address.

The address mode register 49 of FIG. 1 is thus designed to enable the programmer to specify the number of successive characters to be joined together for the purpose of defining a memory location of an operand to be extracted therefrom. The output of the address mode register 49 in addition to being connected to the clock and sequence cycle generator 41 is further connected to the control memory local register 24. This latter connection enables the transfer of control signals which in turn effect the selective transfer of the bit contents of the control memory local register 24 to the A and B operand address register locations of control memory 12.

In addition to conventional direct addressing capabilities available in combination with any of the variable length addressing formats indicated above, the present invention is implemented to enable indirect or indexed addressing in either the three character or four character addressing mode. If conventional direct addressing is specified, the address is taken exactly as it appears in the instruction and is transferred to control memory with no modification being performed thereon. If indexed addressing is specified, the address will be augmented by the index register of the control memory 12 whose number is identical to the bit configuration of an associated indexing indicator. If indirect addressing is specified, the address will be used to specify the location in main memory where the true operand address is stored. The significance of the capability of the above-outlined data processing system to flexibly modify main memory addresses is more fully appreciated in terms of an example involving the execution of the move item and translate instruction.

Figure 2:
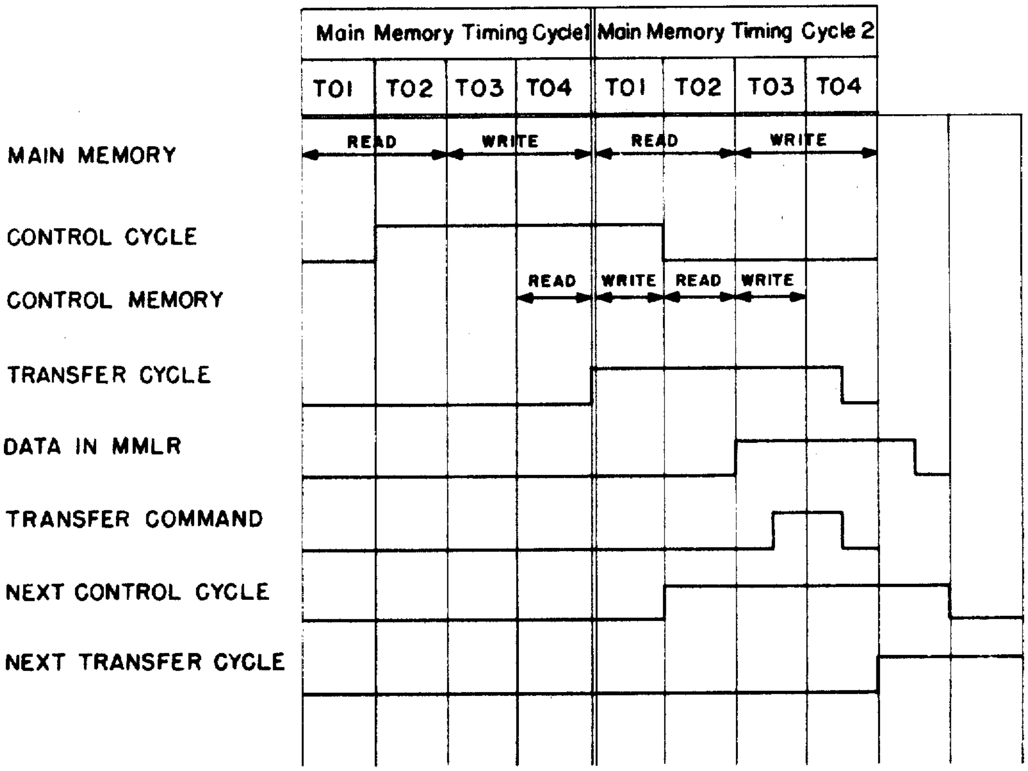
FIG. 2 is a timing chart depicting the time relationship between the various main memory and control memory timing cycles and the control and transfer portions of the operation effected thereby.

In the implementation of a program instruction in the above-outlined system, it is necessary to perform a number of intermediate steps or subcommands. These subcommands are performed during definite periods of time referred to as memory timing cycles. The memory timing cycle may be conventionally defined as the information access time required to read and restore information to a particular location within memory. Referring now to FIG. 2, therein is disclosed the relationship between main memory and control memory timing cycles and the control and transfer portions thereof. It should be noted that each main memory timing cycle is comprised of four memory cycle subintervals TO1 through TO4.

Each main memory timing cycle is further characterized by a control and transfer portion thereof. More specifically, during the control portion of each main memory timing cycle, information is extracted from the control memory 12 and transferred into the main memory address register 14 preparatory to the transfer of information from the addressed location of main memory 10. The control portion of a memory cycle is indicated as comprising four memory cycle subintervals, beginning at subinterval TO2 of the first main memory timing cycle and extending through subinterval TO1 of the succeeding main memory timing cycle. The control and transfer portions are overlapped to such an extent that as one control cycle is terminating, the succeeding control cycle is initiated. Thus for each main memory timing cycle there are corresponding control and transfer portions. It should be apparent from FIG. 3 that the transfer cycle corresponding to each control cycle is initiated at the beginning of subinterval TO1 of the succeeding main memory timing cycle and extends midway through subinterval TO4 thereof.

The information being referenced in memory 10 during the control portion of the main memory timing cycle is actually transferred through the sense amplifiers 28 to the main memory local register 30 beginning with subinterval TO3 and extending into subinterval TO1 of the succeeding main memory timing cycle. During a portion of this time, a transfer command signal is active which effects the transfer of the information being loaded into the main memory local register and its auxiliary, to appropriate register locations within the system. This latter transfer varies in accordance with the nature of the operation being performed and the phase of the operation.

The processing of an instruction involving arithmetical and logical operations occurs in two operative steps; namely, the characters of the instruction are first extracted from main memory whereafter the data identified by the extracted characters is operated upon. The above phases of operation are designated as the extraction and execution phases respectively.

The format required for the implementation of the move item and translate operation in the present system is as follows:

$$F/A/B/V_1/V_2/V_3$$

where,

F=the Op Code defining the operation to be performed as a move item and translate instruction, A=the address field which indicates the starting location of an item to be translated one or two characters at a time, B=the address field which identifies the starting location of main memory into which the translated items are to be placed, $V_1$ and $V_2$=the variant characters which identify the base address of the translation table, and $V_3$=specifies whether the A item characters are to be translated one or two at a time, and whether translation table entries are one or two character entries.

The extraction phase of an instruction is initiated with the data contents of a location in main memory being specified by the sequence counter of the control memory 12. In accordance with the above-defined instruction format, the first character to be extracted is the Op Code or F character which identifies the operation to be performed. In accordance with the nature of operation of the system outlined above, the Op Code is actually brought out of main memory and deposited in the sequence register of control memory 12 during the termination of the extraction phase of the preceding instruction. More specifically, during the extraction phase of the processing of an instruction, each character is brought out of main memory in sequence until a character with an accompanying punctuation bit is detected. The detection of the punctuation bit identifies the last character read as the Op Code of the next succeeding instruction provided the sequence counter is not modified by the instruction about to be executed. The detection of the punctuation bit thus signals the termination of the extraction portion of the instruction.

Figure 3:
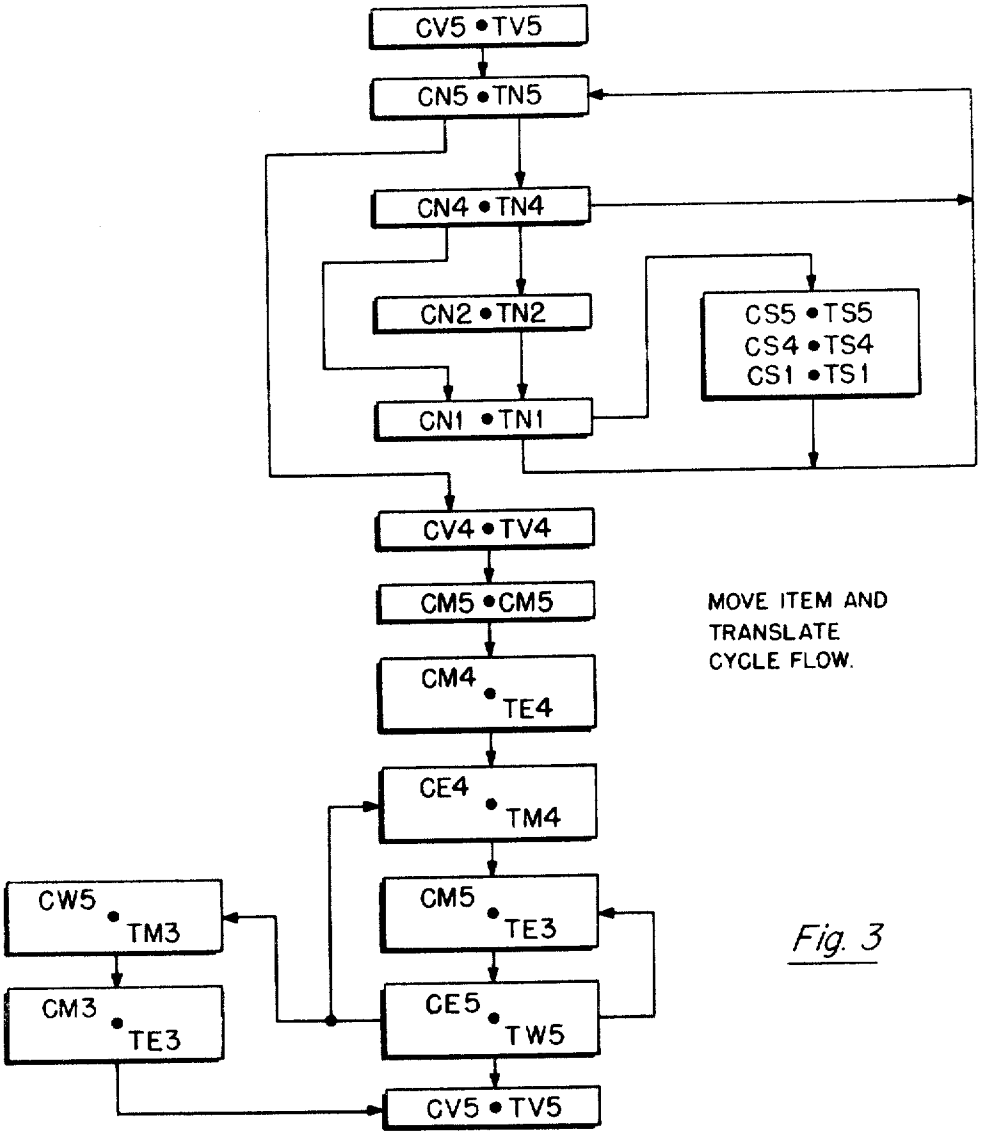
FIG. 3 is a diagrammatic representation depicting the cyclical flow path corresponding to the extraction and execution phases of the move item and translate operation.

Reference is now made to FIG. 3 which discloses a flow chart depicting the memory cycles allocated to the processing of the move item and translate instruction including the extraction and execution phases thereof. The sequence of main memory timing cycles occurring during the extraction and execution portions of the move item and translate instruction will now be discussed in terms of the cycle-oriented phase chart of FIG. 3 and the diagrammatic representation of FIG. 1.

As indicated above, the first step to be taken in the processing of a program instruction is the extraction of the instruction from memory. In the present system this step is accomplished during the extraction phase which is characterized by the generation of subcommands in the control portion of the system to effect the extraction of successive characters of information from main memory 10 defining the instruction to be executed.

As indicated in FIG. 3, the first memory cycle, identified as CV5.TV5, effects the extraction of the operational code, or F character, identifying the instruction to be performed. In this respect, during the control portion of this first memory cycle, the control memory address register 20 addresses the sequence register within control memory 12 and effects the transfer of the contents thereof to the main memory address register 14. During the transfer portion of this first memory cycle, the contents of the main memory location being referenced by the main memory address register 14, are transferred through sense amplifiers 28 and main memory local register 30 to the Op Code register 46. An indicated in FIG. 2, the latter portion of the transfer cycle is completed during the presence of the transfer command signal. During essentially this same time, the contents of the main memory address register 14 are transferred through the auxiliary register 16 wherein they are incremented and returned to the Y register 18.

The second of the memory cycles is identified in FIG. 3 as a CN5.TN5 cycle and is for the purpose of extracting the first character of the A operand address. This cycle is initiated with the contents of the Y register 18 as previously incremented, being transferred to the main memory address register 14 for the purpose of referencing the contents of the specified location in main memory. During the transfer portion of the CN5.TN5 cycle, the information so referenced is transferred through the sense amplifiers 28, the main memory local register 30 into the B operand register 38. The character extracted from main memory is also transferred via the auxiliary main memory local register 32 to the auxiliary Op Code modifier register 48 wherein it is interrogated for indexed or indirect addressing purposes. In the four character addressing mode, this character is used only to define address modification and will not be stored in control memory. Somewhat simultaneous with the transfer of the information from main memory, there occurs an incrementation of the contents of the main memory address register 14 in the auxiliary register 16 and the subsequent storage thereof in the Y register 18.

The next cycle to be initiated is the CN4.TN4 cycle during which the upper portion of the A operand address is to be extracted from main memory and stored in the adder. In this respect, the contents of the Y register as previously incremented are transferred to the main memory address register 14 during the control portion of the CN4.TN4 cycle. The contents of the location within main memory 10 being addressed are subsequently transferred to the main memory local register 30. Upon receipt of the transfer command, the information in the main memory local register 30 is transferred to the B operand register 38 associated with the adder 22. At the same time, the contents of the main memory address register are incremented in the auxiliary register 16 and stored in the Y register 18.

If the present operation had been proceeding in the two character mode, the extraction of the A operand address would have been complete. This accounts for the presence of the return path from block CN4.TN4 of the flow diagram of FIG. 3 to the block CN5.TN5 thereof. Alternatively, if the processing had been proceeding in the three character mode, the next cycle of operation would be that indicated as cycle CN1.TN1. However, for processing in the four character mode, the cycle CN2.TN2 is added to deliver bits 13 through 18 of the address extracted during the preceding memory cycle, to the A address register of control memory 12. Accordingly, during this cycle, the contents of the adder 22 are transferred via the sum register 40 to the high order bit positions of the control memory local register 24, and from thence to the corresponding positions of the A operand address register in control memory 12.

While the information entered into the B operand register 38 associated with the adder 22 during the previous operative cycle is being transferred into control memory 12, the previously incremented contents of the Y register 18 are transferred to the main memory address register 14 for the purpose of extracting the middle portion of the A operand address. During the transfer portion of this memory cycle, the information from the referenced location in main memory is transferred through the sense amplifiers 28 and the main memory local register 30 to the B operand register 38 and from thence to adder 22. At essentially the same time, the contents of the main memory address register are once more incremented in the auxiliary register 16 and restored in the Y register 18. If the operation had been proceeding in the indirect addressing mode, a transfer of the contents of the auxiliary main memory local register to the auxiliary Op Code modifier register 48 would also have been effected during the transfer portion of the present memory cycle.

The next cycle to be initiated is that identified in FIG. 3 as the CN1.TN1 cycle. During this cycle, the contents of the Y register 18 as previously incremented, are transferred to the main memory address register 14. At the same time, the character stored in the adder 22 during the preceding extraction cycle is delivered to positions 7 through 12 of the A address register in control memory 12. The main memory location presently being referenced has information stored therein which is to be transferred through the sense amplifiers 28 to the main memory local register 30 and the auxiliary main memory local register 32 during the transfer portion of the present memory cycle.

If the present operation had been proceeding in the indexed mode, the next cycle to be initiated would be the CS5.TS5 cycle to be followed by the CS4.TS4 and CS1.TS1 cycles during which the respective characters of a designated index register within control memory 12 would be added with corresponding characters extracted from main memory and the results stored in the A operand address register of control memory 12. Assuming, however, that the operation is to proceed in the four character, direct, addressing mode, the next cycle will be a repeat of the CI5.TN5 cycle for the purpose of extracting the first character of the B operand address. The extraction proceeds in the same manner as indicated above for the A operand with the exception that during the CN5.TN5 cycle the low order character of the A address as stored in the B operand register of the adder 22 during the previous extraction cycle is transferred through the control memory local register 24 and into bit positions 1 thru 6 of the A operand address register of control memory 12.

After cycling through the CN4.TN4, the CN2.TN2, and CN1.TN1 cycles in the manner indicated for the extraction of the A operand address, the extraction of the B operand is completed in a CN5.TN5 cycle. During the control portion of this latter cycle, the contents of the Y register 18 as previously incremented are transferred to the main memory address register 14. During the transfer portion of this cycle, the information at the referenced location of main memory is transferred through the sense amplifiers 28, the main memory local register 30 and is thereafter stored in the B operand register 38 associated with the input of added 22. At the same time, the contents of the main memory address register 14 are incremented in the auxiliary register 16 and transferred to the Y register 18.

The next cycle in the extraction phase is the CV4.TV4 cycle during which the character stored in the B operand register 38 during the previous cycle is preserved therein for the duration of the present cycle. At the same time, the contents of the Y register, as previously incremented, are transferred to the main memory address register 14. During the transfer portion of the present cycle, the contents of the referenced main memory location are transferred through the sense amplifiers 28 to the auxiliary main memory local register 32 and from thence to the auxiliary Op Code modifier register 48 for storage therein.

The next cycle is the CM5.TM5 cycle during which the base location of the translation table, comprising variant characters V1 and V2, is stored in working location number 2 of the control memory 12. In this respect, during the first portion of the CM5.TM5 cycle, the V2 character, presently loacted in the auxiliary Op Code modifier register 48, is transferred to positions 7 through 12 of the main memory address register 14 whereafter this information is transferred through the auxiliary register 16 and control memory local register 24 and thereafter deposited in positions 7 through 12 of working location number 2 of control memory 12. During the same control memory cycle, the V1 character previously stored in the B operand register 38 is transferred to the high order character position of control memory local register 24 and from thence to the corresponding bit positions 13 through 18 of working location number 2 in the control memory 12.

In accordance with the format given for the move item and translate instruction, the instruction itself is not completely specified until the V3 character has been extracted from memory. This occurs during the succeeding memory cycle identified in the flow chart of FIG. 3 as cycle CM4.TE4. During the control portion of the cycle, the contents of the sequence register of control memory 12 are transferred through the associated sense amplifiers 26 to the main memory address register 14. This information establishes the main memory address of the V3 character which is transferred from main memory 10, through sense amplifiers 28 to the main memory local register 30 and the auxiliary main memory local register 32, during the transfer portion of the present memory cycle.

As indicated above, the items to be translated as well as the translated equivalent may be of variable length. It is the function of the V3 character presently being extracted from memory to define this relationship. In the preferred embodiment of the present invention, a one or two character parameter length is provided for; however, the basic concept is extendible to accommodate any length item.

As the V3 character is transferred from the auxiliary main memory local register 32 to the translation parameter with register 47, sensing means associated with the two low order bits of the V3 character in the following manner:

| Variant 3: | Operation |
|---|---|
| **00** ---- | Translate a single character as specified by the contents of the A operand address register of control memory **12**; and move the translated equivalent to a single character location as specified by the contents of the B operand address register. |
| **01** ---- | Translate a pair of characters including that specified by the contents of the A operand address register and an immediately adjacent location; and move the translated equivalent to a single character location as specified by the contents of the B operand address register. |
| **10** ---- | Translate a single character as specified by the contents of the A operand address register; and move the translated equivalent to two adjacent character locations including that specified by the contents of the B operand address register. |
| **11** ---- | Translate a pair of characters including that specified by the contents of the A operand address register and in immediately adjacent locations; and move the translated equivalent to two adjacent character locations including that specified by the contents of the B operand address register. |

The above table establishes the relationship between the lowest order bit of the V3 character and the item of information to be translated; while the second lowest order bit of the V3 character pertains to the character mode of the item being moved from the translation table.

The transfer from memory of the V3 character completes the extraction portion of the present instruction. In this respect, all subsequent cycles of the instruction are associated with the actual execution of the order. This phase of the operation is initiated with the CE4.TM4 cycle during which the A operand address register of control memory 12 supplies the main memory address of the first character to be translated. Thus during the control portion of this cycle, the contents of the A operand address register are transferred through the sense amplifiers 26 into the main memory address register 14. During the transfer portion of the CE4.TM4 cycle, the contents of the referenced location of main memory 10 are transferred, through sense amplifiers 28, to the main memory local register 30 and the auxiliary main memory local register 32. Upon receipt of the transfer command, the contents of the auxiliary main memory local register 32 are transferred to the auxiliary Op Code modifier register 48. During this same time, the contents of the main memory address register 14 are incremented in auxiliary register 16 and then returned to the A operand address register of control memory 12 through the control memory local register 24.

As indicated above, defining punctuation is used in combination with the stored information to, among other things, terminate particular operations. In this respect, execution of the present operation terminates following the translation of a table entry wherein the character specified by the A operand address register of control memory 12 contains a defining bit of punctuation. Alternatively, the execution will terminate upon the detection of a second defining bit of punctuation associated with a selected character of the translation table itself. Accordingly, conventional logical sensing circuits 50 and 51 are shown positioned to sense the contents of the auxiliary Op Code modifying register 48 and the B operand register 38 during the pertinent portions of the present operation so as to detect the presence of the defining punctuation. Upon detection of defining punctuation, a signal is generated and transferred by the sensing circuit 50 or 51 to the clock and sequence cycle generator 41 which in turn generates and distributes necessary control signals to appropriately modify operations within the system. Such a circuit may comprise a set of logic gates appropriately conditioned to pass a signal to the associated sequence cycle generator 41 upon the occurrence of any defining punctuation bits. Structure to accommodate this and other logical structures necessary to the implementation of the present invention are provided in accordance with formulations described in the section beginning on page 31 of the book "Arithmetic Operations in Digital Computers" by R. K. Richards, published 1955 by D. Van Nostrand Co.

If the low order bit of the V3 character, as presently stored in the translation operand width register 47, is a "one" indicating that the item to be translated is defined by two cascaded characters, a second CE4.TM4 cycle must be performed to enable the extraction of the remaining A character. Where two characters are to be compounded to define the table look-up address of the item to be translated, the CE4.TM4 cycle is repeated in a manner essentially equivalent to that utilized to effect the extraction of the first A character. The second A item to be extracted from main memory is stored in the auxiliary main memory local register 32. If the second lowest order bit of the V3 character, as stored in the translation operand width register 47, is a one indicating that the translated equivalent is comprised of two characters; each of the A characters to be extracted will be shifted one bit position to the left upon delivery to the auxiliary main memory local register 32.

The next cycle to be initiated is the CM5.TE3 cycle wherein the translation table will be interrogated in search of the equivalent of the item identified by the A operand address characters as superimposed upon the V1 and V2 characters. The main memory address of the translated equivalent is generated in the main memory address register 14 by first moving the table base location comprising variant characters V1 and V2, into bit positions 7 through 18 thereof. This is followed by the transfer of the contents of the auxiliary main memory local register 32 to the low order six bit positions of the main memory address register 14 if the translation is to be on a single character to single character basis.

If the translation is to be on a double character to single character basis the latter transfer is accompanied by the transfer of the information in the auxiliary Op Code modifier register 48 into the bit positions 7 through 12 of the main memory address register. In this latter instance, the information being transferred from the auxiliary Op Code modifier register 48 as well as that comprising the V2 character as presently located in the bit positions 7 through 12 of the main memory address register 14 are selectively related with respect to actual information content to assure the proper identification of the character being translated. If the translated equivalent is expressed in the two character mode, the 7 bit shifted representation of the A1 character or the 13 bit shifted representation of the A1–A2 characters are superimposed on the base address comprising the V1 and V2 characters.

Figure 4B:
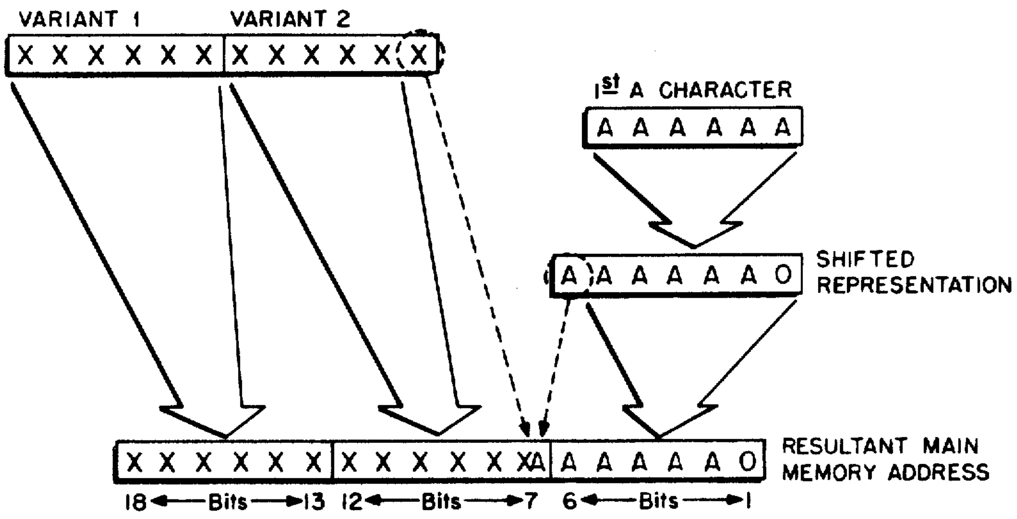
FIGS. 4A and 4B illustrate how the superpositioning of characters of information from separate sources may occur for the purpose of defining the address of a main memory location.
Figure 4A:
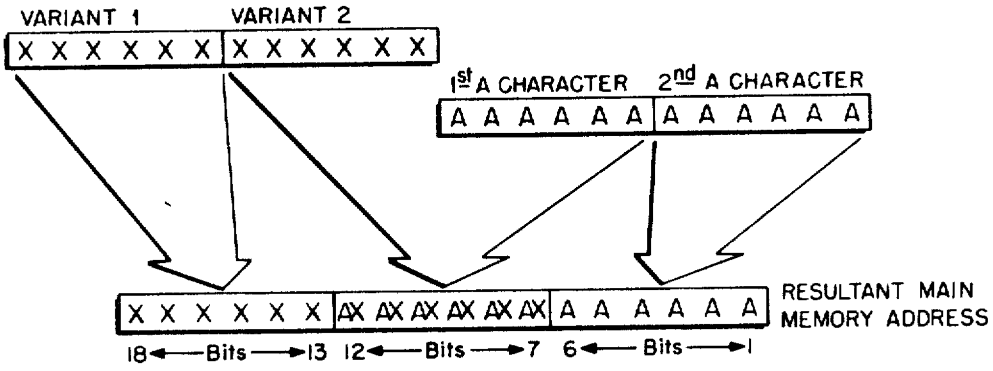

Reference is now made to FIG. 4A which discloses the relationship between the V1 and V2 characters comprising the base address of the translation table and the contents of the main memory location specified by the A operand address register of control memory 12. In addition, assuming initially that the item to be translated is expressed as a pair of characters, FIG. 4A also shows the contents of an immediately adjacent main memory location. In this respect, the 12 data bits comprising the first and second A characters are superimposed over the base address comprising the V1 and V2 variant characters. In the illustration of FIG. 4A, the letter "A" indicates the respective bits of the A character while the letter "X" indicates the respective bits of the base address.

Superpositioning of the base address with the character or characters identifying an item to be translated is performed by placing a 1 bit in every position of the main memory address register for which a 1 existed in the corresponding bit position of either the A characters on the base address or both. The logical function for expressing this relationship is the conventional logical "Inclusive OR" function.

It should be apparent from the superpositioning relationship existing between the V1 and V2 characters comprising the base address of the translation table and the A1 and A2 characters identifying the item to be translated, that no theoretical limit is placed on the length of the item to be translated. The relationship between the number of bits of the first A character used in identifying the item to be translated and the superimposed bits of the V2 character are such that the unused portion of the first A character permits the specification of the base address of the translation table in a much more flexible manner than that hitherto afforded by conventional addressing techniques. This latter feature reflects directly on the ability to vary, within the limits established by the length of the translation table, the starting location of the translation table within main memory.

Referring now to FIG. 4B, therein is shown the manner of expressing the stored equivalent of a 6 bit item to be translated, in terms of a shifted representation in a variable number of bits within the limits of two adjacent character locations, i.e., within bits 1 through 12 in FIG. 4B. More specifically, in the case where the translated equivalent of an item to be translated is of such length so as to be non-representable within the limits of a single character of the memory store, a second storage location may be used to complete the storage of the translated equivalent. In such instances, the two characters expressing the translated equivalent are automatically extracted provided this mode of operation has been specified. Thus, with particular reference to the illustration of FIG. 4B, it is noted that the bit representation corresponding to the V1 and V2 characters constitutes the high order or base portion of the table lookup address.

In the translation of a single character item into a two character equivalent, the 64 possible translatable items require 128 character locations in memory to store the lookup table. By effecting a one bit left shift of the item to be translated while setting the rightmost bit position of the resultant 7 bit character to 0, it is possible to double the referenced table address and thereby uniquely define the first of two memory locations containing the translated equivalent. Thus, the first of the two characters comprising the translated equivalent of an item is completely identified by the 7 bit character having the appended 0 as its low order bit, when it is superimposed over the base address. The second of the two adjacent memory locations is referenced by incrementing or decrementing the contents of the main memory address register utilized to effect the extraction of the first character. It should be obvious to those skilled in the art that by shifting the most significant bit of the character identifying the item to be translated through one or more additional bit positions and appending an appropriate number of "0's" to the lower order positions, that any number of characters can be accommodated with the leftmost character being uniquely identified as the first character to be extracted.

In the examples illustrated in FIGS. 4A and 4B and as described herein, it has been left up to the programmer to assure that the respective bits of the base address of the lookup table and the identity of a translated equivalent of an item being referenced are uniquely related. In the particular examples illustrated, this relationship has occurred on a mutually exclusive basis. However, there are other applications of the superpositioning principle wherein it is particularly advantageous to express the bit relationship on a mutually inclusive basis. More specifically, it may be that an item to be translated may be expressed in an expanded code configuration which enables both upper and lower case letters to be distinguished. The code configuration representing the translated equivalent may be expressed in a more limited number of bits provided no recognition is given to upper and lower case letters. Accordingly, if in the item to be translated, the bit configurations defining the upper and lower case letters differ by the representation at a particular bit position, it is possible when working with an item to be translated which is expressed in the two character mode to insert a "one" bit in the appropriate position of the V2 character, thus effecting the selection of the available character in response to either the upper or lower case configuration.

Cycle CM5.TE3 continues with the character contained in the main memory location as specified by the present contents of the main memory address register 14, being extracted and stored in the B operand register 38 associated with the input to adder 22, as well as the operational code modifier register 44. This latter transfer is effected to insure the availability of the last character extracted from the translation table should such character have defining punctuation associated therewith which would automatically effect a change sequence mode of operation. The storage of the character in the operational code modifier register 44 thus enables the newly initiated co-sequence routine to conveniently reference this information during the continuation of its operative cycle.

If the information being transferred from the translation table is comprised of two characters, the contents of the main memory address register 14 are transferred in incremented fashion to the Y register 18 somewhat simultaneously with the transfer of the information from the main memory local register 30 to the B operand register 38 and the Op Code modifier register 44. Assuming that the contents of the translation table are comprised of two characters, the CM5.TE3 cycle will be repeated in order to effect the extraction of the remaining character from the translation table. In this respect, the contents of the Y register 18, as previously incremented, are transferred to the main memory address register 14 whereafter the contents of the referenced location of main memory are transferred through the sense amplifiers 28 and the main memory local register 30 to the B operand register 38. The contents of the B register are then sensed in the associated sensing circuit 51 for the presence of defining punctuation bits, the presence of which would initiate a change sequence routine.

The next cycle to be performed is the CE5·TW5 cycle which effects a delivery of the translated information from the adder 22 to the storage location of main memory defined by the B operand address register of control memory 12. In this respect, the contents of the B operand address register are transferred through the control memory sense amplifiers to the main memory address register 14 during the control portion of the CE5·TW5 cycle. During the transfer portion of this cycle, the translated equivalent is transferred from the sum register 40 of adder 22 to the main memory local register 30 and thence through the drivers 34 to the main memory address presently being referenced by the contents of the B operand register of control memory 12 .

If the translation table utilizes two characters to express the translated equivalent, a repeat of the CE5·TW5 cycle is initiated to effect the extraction of the second character. If the translated equivalent is stored in a single character in the translation table and the transfer has been completed without the detection of the defining punctuation, and if the field being translated has not terminated, the next cycle will be the CE4·TM4 cycle in which the next character to be translated is extracted. Similarly, if two characters are required to store the translated equivalent in the translation table and both characters have been extracted without the detection of defining punctuation and the field being translated has not been terminated, the next cycle to be extracted will also be the CE4·TM4 cycle.

If the field being translated has terminated and the translation of the last character is complete without the detection of defining punctuation, the move item and translate operation is complete and the processing proceeds to the extraction of the next instruction. This latter operation is initiated with a characteristic CV5·TV5 cycle.

If during the transfer of the translated equivalent to the storage location of main memory defining punctuation was found in the table, the sequence counter and co-sequence counter are interchanged. In this respect, system operation proceeds to the CW5·TM5 cycle which is the first cycle of the change sequence mode operation. Assuming now that the translated equivalent is stored in the translation table in two characters, and that upon the extraction of the first character thereof, defining punctuation is detected indicating that a change sequence mode of operation is to be initiated, a signal is directed to the control portion of the system comprising members 41 and 42 which in turn activate the logic used in processing a change sequence mode instruction. In this respect, the signal representation stored in the sequence counter of control memory 12 is transferred through sense amplifiers 26 to the main memory address register 14 and from thence to the control memory local register 24 wherein it is stored in the co-sequence register locations thereof. The original contents of the co-sequence register presently appear in the control memory sense amplifiers 26 from whence they are transferred to the Y register 18.

The next cycle of the change sequence mode instruction is the CM3·TE3 cycle which finds the original contents of the co-sequence counter as presently stored in the Y register 18 being transferred to the main memory address register 14 which in turn transfers this information to the control memory local register 24 for storage in the sequence counter of control memory 12. The swapping of the sequence counter and co-sequence counter of control memory 12 completes the change sequence mode instruction thus enabling the machine to initiate a CV5·TV5 cycle characterizing the first instruction of this new routine. As indicated above, the purpose of this new routine will usually be concerned with the translation of an item not directly translatable in terms of the limited character space available in the translation table.

It will be apparent to those skilled in the art that other system configurations may well be incorporated within the principles of the present invention so long as the general operating characteristics are maintained compatible with the principles set forth above in connection with the operation of FIG. 1.

While in accordance with the provisions of the statutes, there has been illustrated and described the best forms of the invention known, certain changes may be made in the apparatus described without departing from the spirit of the invention as set forth in the appended and that, in some cases, certain features of the invention may be used to advantage without a corresponding use of other features.

Having now described the invention, what is claimed as new and novel and for which it is desired to secure by Letters Patent is:

1. In a character implemented data processing apparatus including means to effect the translation of an operand of variable width by referencing a lookup table capable of being variably positioned within an information store, the combination comprising an addressable information store for storing instructions and data, addressing means operatively connected to said information store for the purpose of addressing a particular memory location therein, said last named means further characterized by a multicharacter storage facility including the ability to selectively superimpose characters of information from a plurality of character sources so as to generate the address of a desired location within said information store, first means connected to the input of said addressing means for storing the first of a sequence of lookup table addresses each identifying the relative position within said lookup table of the translated equivalent of an item to be translated, means connected to said first means for shifting the digital representation prior to the transfer thereof to said information store addressing means whereby said shifted representation uniquely defines the first character of a multicharacter equivalent corresponding to each item being translated, second means connected to the input of said addressing means for storing the base address of said lookup table as stored within said information store whereby a variable number of items to be translated may be sequentially referenced by selectively superimposing the contents of said first and second means in said information store addressing means, means connected to the output of said information store to sense the content of a referenced location of said information store and to generate control signals in response thereto, said control signal generating means being responsive to particular signal combinations associated with the contents of an addressed location within said instruction store to initiate an alternative mode of operation.

2. In a character implemented data processing apparatus including means to effect the translation of an operand of variable width by referencing a lookup table capable of being variably positioned within an information store, the combination comprising an adressable information store for storing instructions and data, addressing means operatively connected to said information store for the purpose of addressing a particular memory location therein, said last named means further characterized by a multicharacter storage facility including the ability to selectively superimpose characters of information from a plurality of character sources so as to generate the address of a desired location within said information store, first and second sources of addressing information connected to selective bit locations of said addressing means to identify the position within the lookup table of the translated equivalent of an item to be translated, a third source of addressing information connected to selective bit locations of said addressing means to specify the base location of said translation table in said information store, and means connected to the output of said information store to formulate the complete translated equivalent by combining items of information stored in adjacent storage locations of said information store.

3. In an electronic data processing apparatus, the combination comprising an addressable information store, addressing means operatively connected to said information store for registering a digital representation establishing the identity of a particular location presently being referenced, a control portion connected to said addressing means, said control portion including means for storing information pertinent to the referencing of a particular location within said information store, and means for shifting the digital representation stored in said control portion prior to the transfer thereof to said information store addressing means whereby said shifted representation uniquely defines the address of the first of a plurality of adjacent information store locations to be referenced.

4. In an electronic data processing system, the combination comprising an addressable information store, addressing means operatively connected to said information store for storing a digital representation establishing the identity of a particular location presently being referenced, said last named means further characterized by the ability to superimpose information from a plurality of sources such that the resultant digital representation stored therein corresponds to the address of a desired location within said information store addressing means whereby said digital information sources including means for shifting its digital representation prior to the transfer thereof to said information store addressing means whereby said shifted representation uniquely defines the address of the first of a series of adjacent information store locations to be referenced.

5. In a stored program data processing apparatus including means to effect the translation of a character oriented operand, the combination comprising an addressable information store for storing instructions and data, addressing means operatively connected to said information store for referencing the contents of a particular location therein, said last named means further characterized by a multicharacter storage facility including the ability to selectively superimpose characters of information from a plurality of character sources so as to generate the address of a desired location within said information store, first means connected to the input of said addressing means for storing the first of a sequence of information store addresses identifying the translated equivalent of an item to be translated, second means connected to the input of said addressing means for storing the base address of said lockup table as stored within said information store whereby a variable number of items to be translated may be sequentially referenced by selectively superimposing the contents of said first and second means in said information store addressing means, means connected to the output of said information store to sense the contents of a referenced location of said information store and to generate control signals in response thereto, said control signal generating means being responsive to particular signal combinations associated with the contents of an addressed location within said instruction store to initiate an alternative mode of operation.

6. In a data processing apparatus including means to effect the translation of a character oriented operand by referencing a lookup table capable of being variably positioned within an information store, the combination comprising addressing means operatively connected to said information store for registering a digital representation establishing the identity of a particular location desired to be referenced; a control portion connected to said addressing means, said control portion further comprising first means for storing the base address of said lookup table, second means for storing a digital representation identifying the first of a sequence of lookup table addresses each identifying the relative position within said lookup table of the translated equivalent of an item to be translated, and means connected to said second means for shifting the digital representation prior to the transfer to said information store addressing means whereby said shifted representation uniquely defines the address of the first of a plurality of adjacent information store locations corresponding to a single one of the translated equivalents of an item being translated.

7. A data processing apparatus including means for translating an item expressed in a first variable width bit representation to a translated equivalent comprising a second variable width bit representation wherein the translated equivalent is stored in a lookup table comprising a portion of an addressable memory store, said apparatus further comprising address selection means associated with said memory store for selectively referencing locations therein, first register means for storing a digital representation indicative of the base location of said lookup table in said memory store, second register means for storing a digital representation identifying the translated equivalent of an item stored within said lookup table, means connected to ascertain the number of bit positions utilized to represent the translated equivalent stored within said lookup table, first transfer means connecting said first register means to said memory store addressing means to effect the transfer of the bit representation defining the base location of said lookup table into selective locations of said memory store, second transfer means connecting said second register means to said memory store addressing means, said second transfer means being adapted to effect the transfer of the contents of said second storage means into selective locations of said addressing means in a direct or shifted representation in accordance with control signals generated by said means for ascertaining the number of bits utilized to represent a translated equivalent of said item being translated.

8. A character-implemented data processing apparatus including means to effect the translation of a first multibit item of variable length into an equivalent expression also represented in terms of a variable number of bits and stored in a lookup table comprising a portion of an addressable memory store, said apparatus further comprising first means for storing a bit representation identifying the base location of said lookup table containing the translated equivalent of an item being translated, second means for storing a bit representation identifying a particular one of said translated equivalents stored within said lookup table portion of said memory store, third means adapted to store a digital representation received from said memory store, control means for storing a bit representation of the length of said first item and of the number of bits of said equivalent expression, transfer means connecting said third storage means to said second storage means to thereby enable the transfer of the contents of said third storage means to said second means, said transfer means being responsive to the contents of said control means to perform said transfer in a direct or shifted representation, a fourth storage means, means connecting the output of said first and second storage means as inputs to said fourth storage means whereby the contents of the respective bit locations of said first and second storage means may be superimposed directly in corresponding locations of said fourth storage means, whereby the bit representation produced by said superpositioning operation uniquely defines the first of a plurality of character locations within said memory store.

9. In a stored program data processing apparatus, the combination comprising an addressable information store for storing instructions and data to be processed under control of said stored program, addressing means operatively connected to said information store for referencing the contents of a particular location therein, said last-named means further characterized by a multi-position storage facility having an ability to superimpose digital representations from a plurality of sources such that the resultant digital representation stored within said addressing means corresponds to the address of a desired location within said information store, a control portion connected to said addressing means, said control portion further comprising first and second register means for storing said digital representations to be superimposed in said addressing means.

10. A data processing apparatus including means for translating a variable bit operand into an alternative coded form by referencing a lookup table capable of being variably positioned within an information store, comprising a register for addressing locations within said information store, said register including means to superimpose digital representations from a plurality of sources so as to generate the address of a desired location within said information store, and where said at least one of said sources identifies the position within the lookup table of the translated equivalent of an item to be translated while another of said sources identifies the base location of the lookup table within said information store.

11. A data processing apparatus wherein there is provided a look-up table comprising locations in an addressable information store for translating an operand into an alternative coded form, and a register coupled to said information store and adapted for addressing said locations, said register including means for combining digital representations, said apparatus being further characterized in that the look-up table is variable positioned within the store, a plurality of sources including at least first and second sources, said first source being coupled to said register and adapted to store the identity of the position within the look-up table of the translated equivalent of an item to be transferred, said second source coupled to said register and adapted to store the identity of the base location of the look-up table within the information store, that said combining means superimposes the digital representations from said plurality of sources including said first and second sources to generate the address in said table of a desired location and, further, that said combining means performs said superimposition operation by performing a logical operation combining said digital representations so that at least one digital representation of said generated address is responsive to the digital representations from more than one of said sources.

12. Data processing apparatus according to claim 11 further comprising a third source adapted for storing a digital representation which together with the contents of said first source identifies the position of the translated equivalent of an item to be translated within said lock-up table of said addressable information store said third source being coupled to said register, and means of said register adapted to selectively superimpose said digital representations in accordance with the digital representation in said third source by the performance of an inclusive OR operation.

13. Data processing apparatus according to claim 11 further comprising means connected to said register and to said second source, said means adapted for selectively incrementing or decrementing the digital representations in said register whereby said digital representations of said generated addresses uniquely define the location address of the first character of a multi-character equivalent corresponding to each item being translated and said incremented or decremented digital representations of said generated addresses define the adjacent location addresses of the remaining characters of said multi-character equivalents.

14. Data processing apparatus according to claim 11 including a control unit connected to receive the output of said information store when referenced by the said register and responding to defining punctuation associated with the stored equivalent of an item being translated to initiate a change sequence mode of operation.

15. Data processing apparatus according to claim 11 including arithmetic combining means connected to the output of said information store and formulating the complete, translated, equivalent of the character to be translated by combining items of information retrieved from adjacent storage locations of the information store.

16. Data processing apparatus according to claim 11 further comprising means for determining the number of bit positions utilized to represent the translated equivalent which is stored within the look-up table of the character to be translated, and in which said first source includes first transfer means connecting said first source to said register for transferring the contents of the said first source into selective locations of said register and thereby to furnish said register with one of said digital representations, said transfer means coupled to said determining means and being responsive to said determining means to perform said transfer in a direct or shifted representation, and in which said second source includes second transfer means connected to furnish said register with another of said digital representations so as to effect the transfer of the bit representations defining the base locations of the look-up table.

References Cited

UNITED STATES PATENTS

| | | | |
|---|---|---|---|
| 3,034,720 | 5/1962 | Taylor ---------- | 235—155 XR |
| 3,262,100 | 7/1966 | Bespalko et al. ---- | 340—172.5 |
| 3,270,324 | 8/1966 | Meade et al. ------ | 340—172.5 |
| 3,299,261 | 1/1967 | Steigerwalt ------ | 235—175 XR |

OTHER REFERENCES

Journal of the Association for Computing Machinery, vol. 12, No. 4, October 1965, pp. 589–601.

RAULFE B. ZACHE, Primary Examiner

UNITED STATES PATENT OFFICE
CERTIFICATE OF CORRECTION

'atent No. 3,522,589 August 4, 1970

John E. Thron et al.

It is certified that error appears in the above identified patent and that said Letters Patent are hereby corrected as shown below:

Column 17, line 71, after "second" insert -- storage --. Column 18, line 66, "lock-up" should read -- look-up --; line 68, 'and" should read -- said --.

Signed and sealed this 2nd day of March 1971.

(SEAL)
Attest:

Edward M. Fletcher, Jr.
Attesting Officer

WILLIAM E. SCHUYLER, JR.
Commissioner of Patents